United States Patent [19]

Chavez, Jr. et al.

[11] Patent Number: 6,167,254

[45] Date of Patent: Dec. 26, 2000

[54] COORDINATION OF MESSAGE WRITING INDICATIONS AMONG A PLURALITY OF INDEPENDENT COMMUNICATION SYSTEMS

[75] Inventors: David L. Chavez, Jr., Thornton; Larry J. Hardouin, Westminster, both of Colo.

[73] Assignee: Avaya Technology Corp., Miami Lakes, Fla.

[21] Appl. No.: 09/039,970

[22] Filed: Mar. 16, 1998

[51] Int. Cl.[7] ................................................. H04M 11/10
[52] U.S. Cl. .................. 455/412; 379/88.12; 379/88.22; 455/413
[58] Field of Search ...................................... 455/412, 413, 455/426, 461; 379/88.12, 84, 88.22, 88.23

[56] References Cited

U.S. PATENT DOCUMENTS

| | | | |
|---|---|---|---|
| 4,495,647 | 1/1985 | Burke et al. | 455/38.1 |
| 4,582,959 | 4/1986 | Myslinski et al. | 179/27 |
| 4,788,715 | 11/1988 | Lee | 379/84 |
| 4,942,598 | 7/1990 | Davis | 379/57 |
| 5,649,003 | 7/1997 | Kapsales et al. | 379/201 |
| 5,666,399 | 9/1997 | Bales et al. | 379/419 |
| 5,684,872 | 11/1997 | Flockhart et al. | 379/266 |
| 5,745,551 | 4/1998 | Strauch et al. | 455/413 |
| 5,761,271 | 6/1998 | Karnowski | 379/1 |
| 5,802,466 | 9/1998 | Gallant et al. | 455/413 |
| 5,889,839 | 3/1999 | Beyda et al. | 379/88.12 |
| 5,944,786 | 8/1999 | Quinn | 709/206 |
| 6,002,750 | 12/1999 | Ertz | 379/88.12 |
| 6,006,087 | 12/1999 | Amin | 455/413 |
| 6,014,559 | 1/2000 | Amin | 455/413 |

*Primary Examiner*—Dwayne D. Bost
*Assistant Examiner*—Erika A. Gary
*Attorney, Agent, or Firm*—John C. Moran

[57] ABSTRACT

Allowing the setting and resetting of a message waiting indicator on a wireless set when a message is waiting in a messaging system. When a messaging system receives a message for a wired set, it places a telephone call to the wireless set associated with the wired telephone set. The messaging system will continue to place telephone calls to the wireless set after every elapse of a predefined period. The wireless set is connected to a wireless switching system which is responsive to telephone calls from the messaging system to set a message waiting indicator. If a telephone call is not received within the predefined period from the messaging system, the wireless switching system resets the message waiting indicator. In another embodiment, the messaging system is responsive to a user accessing messages stored for that user to place a telephone call to a second telephone number identified with the wireless set of the user. The wireless switching system is responsive to telephone calls to the second telephone number of the wireless set to reset the message waiting indicator on the wireless set.

22 Claims, 9 Drawing Sheets

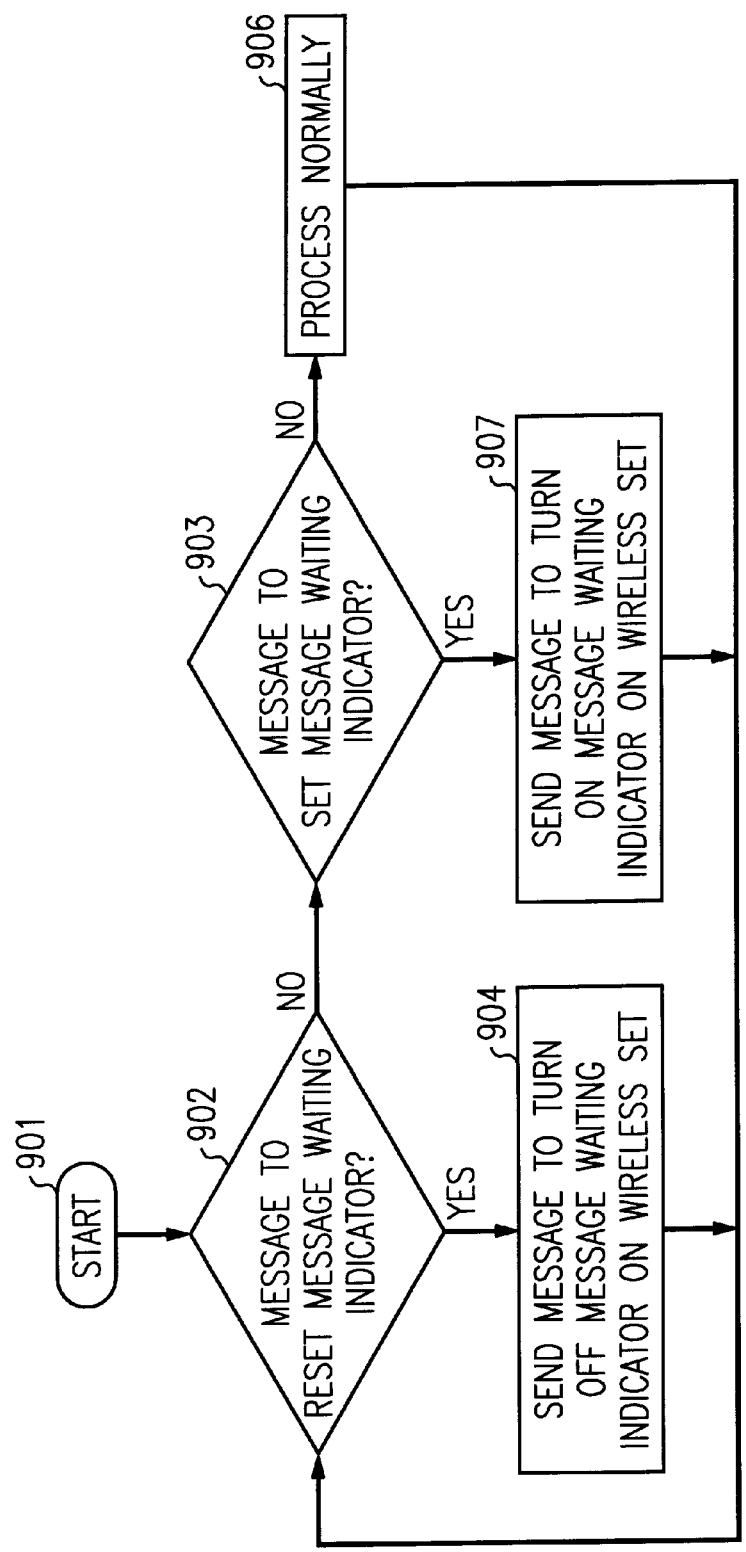

COORDINATION OF MESSAGE WRITING INDICATIONS AMONG A PLURALITY OF INDEPENDENT COMMUNICATION SYSTEMS

TECHNICAL FIELD

This invention relates to telecommunication switching, and, in particular, to the interconnection of messaging systems and wireless switching systems.

BACKGROUND OF THE INVENTION

In telecommunication switching systems, it is well known to use a messaging system such as a voice mail system to store messages for telephones attached to the telecommunication switching system. When a call is placed to an attached telephone set which is not answered, the telecommunication switching system transfers the call to the voice mail system. Upon transferring the call to the voice mail system, the telecommunication system identifies the called telephone set to the voice mail system. The voice mail system prompts the caller to leave a message and then, records that message upon the caller speaking the message. U.S. Pat. No. 4,582,959 discloses a system that when a message is left in the voice mail system, the voice mail system signals the telecommunication switching system, and the telecommunication switching system activates a message waiting indicator on the called telephone set. When the user of the called telephone set retrieves the message from the voice mail system, the voice mail system sends another message to the telecommunication switching system which resets the messaging waiting indicator on the telephone set. These operations have proven invaluable to users of telephone systems since a user can determine by glancing at their telephone set if there is a message waiting for them on the messaging system. In addition, the invention of U.S. Pat. No. 4,582,959 has been applied to other messaging systems than just voice mail systems.

Within the telecommunication industry, it has become common for users to have telephone sets wired to a telecommunication system and to have a wireless set which is connected via a wireless switching system to the telecommunication switching system. User has both a wired and wireless set with each set having a different telephone number. When a message is left on a voice mail system, the voice mail system causes the telecommunication system to set the message waiting indicator on the called telephone set but is incapable of setting an indication on the user's wireless set. Since the purpose of having both a wired telephone set and a wireless set is to allow a user to maintain constant communication via the telecommunication system, the inability to indicate on the wireless set that a message is waiting is a serious deficiency. Within the prior art, users have attempted to overcome this deficiency by utilizing a feature in voice mail systems called outbound calling. The outbound calling feature allows a user to designate a telephone number which will be called by the voice mail system every fixed time period if a message is waiting for the user in the voice mail system. Users have designated pagers as the number to be called for the outbound calling or have designated the telephone number of the wireless set. The problem with designating a pager as the device to be called by the outbound calling is that it requires a user to carry both a wireless set and a pager. The problem with directing calls from the outbound feature to the wireless set are that the user may not wish to access the message and is bothered by the continuing ringing of the wireless set.

SUMMARY OF THE INVENTION

A technical advance is achieved by an apparatus and method that allow the setting and resetting of a message waiting indicator on a wireless set when a message is waiting in a messaging system. When a messaging system receives a message for a wired set, it places a telephone call to the wireless set associated with the wired telephone set. The messaging system will continue to place telephone calls to the wireless set after every elapse of a predefined period. Advantageously, the wireless set is connected to a wireless switching system which is responsive to telephone calls from the messaging system to set a message waiting indicator if the wireless set does not answer the first telephone call from the messaging system. On subsequent calls from the messaging system, the wireless switching system takes no action. When the user of the wireless set places a call to the messaging system after the message waiting indicator has been set, the wireless switching system resets the message waiting indicator. In addition, if a telephone call is not received within the predefined period from the messaging system, the wireless switching system resets the message waiting indicator on the assumption that the user retrieved the message stored in the message system utilizing a different type of communication unit than the wireless set.

In a second embodiment, the messaging system is responsive to a user accessing messages stored for that user to place a telephone call to a second telephone number identified with the wireless set of the user. The wireless switching system is responsive to telephone calls to the second telephone number of the wireless set to reset the message waiting indicator on the wireless set. In a third embodiment, a telecommunication switching system to which the wired telephone set of a user is connected is responsive to a message from the messaging system to set the message waiting indicator and responsive to a second message from the messaging system to reset the message waiting indicator. The messaging system sends the second message to the telecommunication system after the user has accessed the messages stored on the message system. Advantageously, the telecommunication switching system is responsive to the second message to set up a telephone call to the wireless switching system utilizing a second telephone number identified with the wireless set. The wireless switching system is responsive to telephone calls to the second telephone number of the wireless set to reset the message waiting indicator on the wireless set. In a fourth embodiment, the telecommunication switching system transmits a message to the wireless switching system requesting that it reset the message waiting indicator after the telecommunication system receives the second message from the messaging system.

These and other advantages and features of the invention will become more apparent from the following description of the illustrative embodiments of the invention considered together with the drawing.

BRIEF DESCRIPTION OF THE DRAWING

FIGS. 8 and 9 illustrate, in flow chart form, the steps performed to implement the fourth embodiment of the invention.

DETAILED DESCRIPTION

Figure 1:
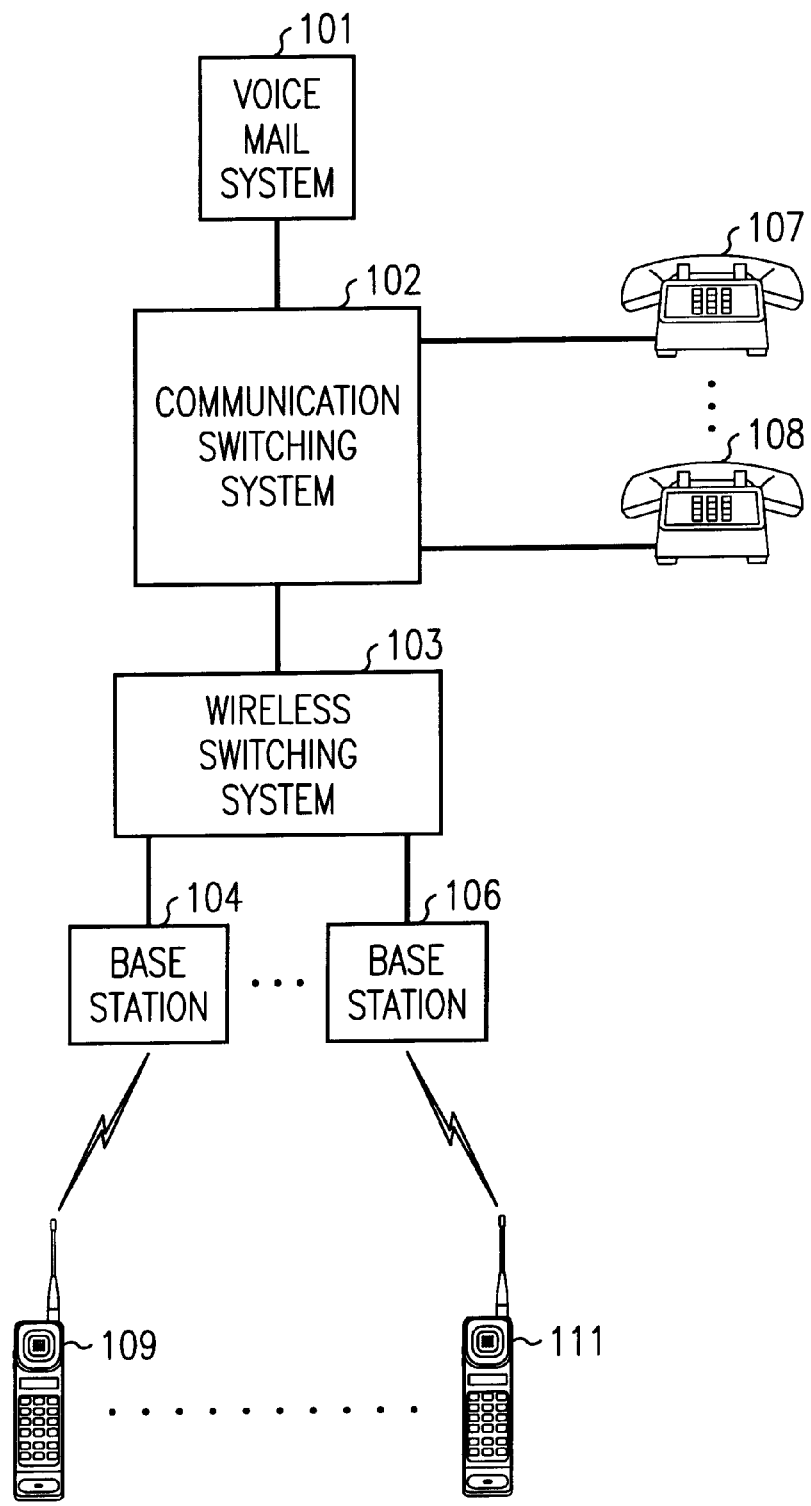
FIG. 1 illustrates, in block diagram form, a communication system for implementing the invention.

FIG. 1 illustrates a communication system. Voice mail system 101 provides messaging for wired sets 107–108 that are connected by wired links to communication switching system 102. Wireless switching system 103 in conjunction with communication system 102 provides communication service for wireless sets 109–111 via base stations 104–106. Each wireless set is assigned to a user, and the user also has an assigned wired set. For example, the user of wired set 108 is also assigned wireless set 109. Wireless set 109 is said to be associated with wired set 108. If the user of wired set 107 places a call to wired set 108 which is not answered, communication switching system 102 transfers the call from wired set 107 to voice mail system 101 and informs voice mail system 101 via a message that the call had been intended for wired set 108. Voice mail system 101 then records a voice message from the user of wired set 107 for the user of wired set 108. Voice mail system 101 then transmits a message to communication switching system 102 to set the message waiting indicator of wired set 108. Utilizing a feature referred to as outbound calling by those skilled in the art, voice mail system 101 places a telephone call to wireless set 109 at predefined intervals via communication switching system 102, wireless switching system 103, and base station 104. Those skilled in the art could readily envision other features or programming of voice mail system 101 that would result in telephone calls being placed to wireless set 109 at predefined intervals. Wireless switching system 103 is responsive to the first call from voice mail system 101 to determine if this is the first call from voice mail system 101. Wireless switching system 103 makes this determination based on a message waiting flag that is maintained for each of the wireless sets. If the message waiting flag is not set meaning it is the first call, wireless switching system 103 attempts to establish a call to wireless set 109. If wireless set 109 does not answer, wireless switching system 103 sets the message waiting flag and starts a timer. The timer defines the predefined interval in which voice mail system 101 should attempt to call wireless set 109 again if there is still a message waiting for wired set 108 in voice mail system 101. After the first call is not answered, wireless switching system 103 transmits a message to wireless set 109 to set the message waiting indicator on wireless set 109. When another call is received from voice mail system 101, wireless switching system 103 examines the message waiting flag, notes that is set and simply restarts the timer. If the user utilizes wireless set 109 places a call to voice mail system 101, wireless switching system 103 interprets this as an indication that the user is accessing the message stored on voice mail system 101 and turns off the message waiting indicator on wireless set 109. Also, wireless switching system 103 stops the timer for wireless set 109. If the user utilizes wired set 108 or another telephone set to access voice mail system 101 to obtain the message, voice mail system 101 stops trying to call wireless set 109 at the predefined intervals. When this occurs, the timer elapses that is maintained by wireless switching system 103 for wireless set 109, and wireless switching system 103 resets the message waiting indicator on wireless set 109 and stops the timer.

Figure 2:
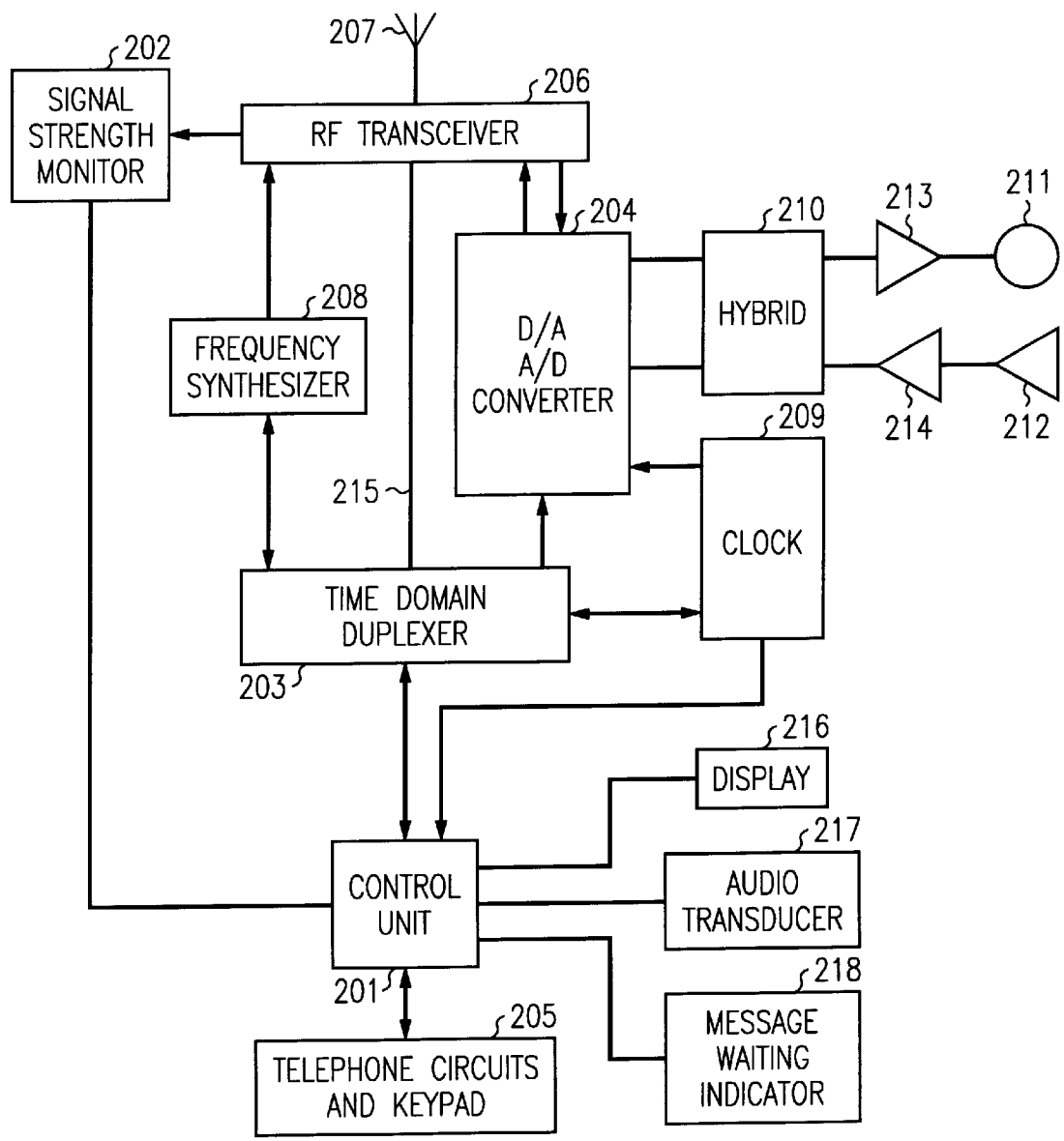
FIG. 2 illustrates, in block diagram form, a wireless set for utilization in the communication system of FIG. 1.

When wireless switching system 103 is a wireless telephone switching system, wireless set 109 is advantageously illustrated in greater detail in FIG. 2. The other wireless sets are similar in design. Wireless set 109 implements a wireless protocol that allows wireless set 109 to maintain a wireless signal link with wireless switching system 103 via base stations included in wireless switching system 103. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless set is provided by control unit 201. Units 202, 203, 206, 207, 208, and 209 provide the RF communication capabilities for the wireless set. Elements 204, 210, and 211–214 provide the audio information received and transmitted to the user; whereas, elements 216–218 and 205 provide the basic user interface. Wireless Switching system 103 uses the message set to set and reset message waiting indicator 218.

When wireless switching system 103 is a paging system, wireless set would be a pager which are well known in the art.

Figure 3:
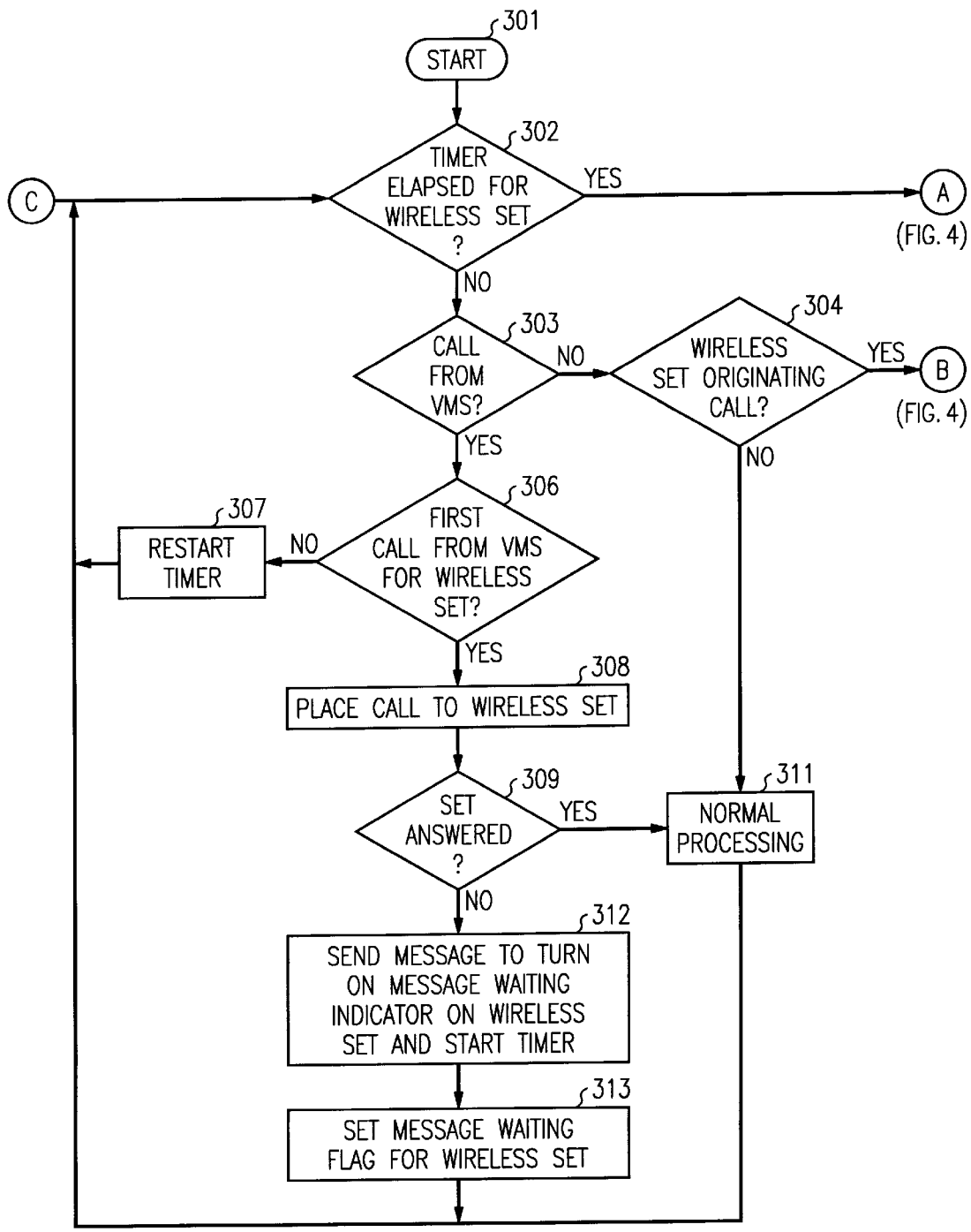
FIGS. 3 and 4 illustrate, in flow chart form, the steps performed to implement the first embodiment of the invention.
Figure 4:
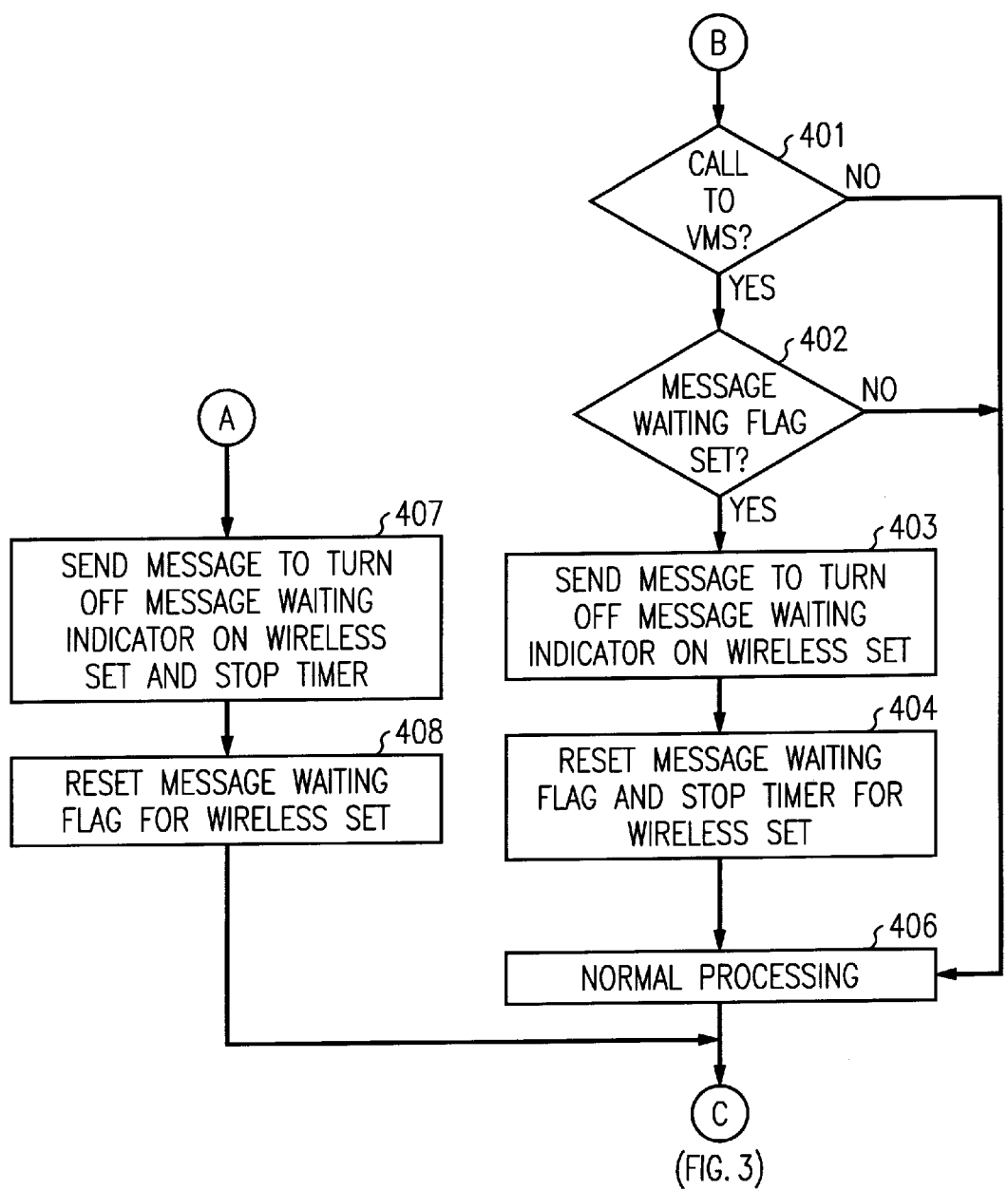

FIGS. 3 and 4 illustrate, in flow chart form, the steps performed by wireless switching system 103 in implementing the first embodiment of the invention. After the steps are started by block 301, decision block 302 first determines if a timer has elapsed for any of the wireless sets. If the answer is yes, control is transferred to block 407 of FIG. 4. If the answer is no, decision block 303 determines if a call is being received from voice mail system 101. If the answer is yes, decision block 306 determines if this is the first call from voice mail system 101 for this particular wireless set. If the answer is no, block 307 restarts the timer for the wireless set before returning control to decision block 302.

Returning to decision block 306, if the answer is yes, block 308 places a call to the wireless set and decision block 309 determines if the call is answered. If the call is answered, decision block 309 transfers control to block 311 for normal processing. Block 311 returns control to decision block 302. If the call from voice mail system 101 is not answered, block 312 sends a message to the wireless set to turn on the message waiting indicator and starts the timer before transferring control to block 313. Block 313 sets the message waiting flag for the wireless set and returns control to decision block 302.

Returning to decision block 303, if the call is not from voice mail system 101, control is transferred to decision block 304. Decision block 304 determines if the wireless set is originating a call. If the answer is no, block 311 performs normal processing. If the answer in decision block 304 is yes, control is transferred to decision block 401 of FIG. 4. Decision block 401 determines if the wireless set is placing a call to voice mail system 101. If the answer is yes, decision block 402 determines if the message waiting flag is set for the wireless terminal. If the answer is no, control is transferred to block 406 for normal processing before control is returned to decision block 302 of FIG. 3. If the answer in decision block 402 is yes, block 403 sends a message to the wireless handset to turn off the message waiting indicator, and block 404 resets the message waiting flag and stops the timer for the wireless set before transferring control to block 406. Block 406 will complete the call to voice mail system 101 before transferring control back to decision block 302 of FIG. 3.

Returning to decision block 302 of FIG. 2, if a timer has elapsed for a wireless set, control is transferred to block 407 of FIG. 4. The elapse of a timer for a wireless set means that the message has been accessed on voice mail system 101 by a communication device other than the wireless set. Block 407 sends a message to the wireless set to turn the message waiting indicator off and stops the timer. Then, block 408 resets the message waiting flag for the wireless set and returns control to decision block 302. When wireless switching system is a paging system, blocks 401–406 will not be executed.

In the second embodiment of the invention, each wireless set that is associated with a wired set has three telephone numbers. The first two telephone numbers are utilized by voice mail system 101 to set and reset the message waiting indicator on the wireless set. The third telephone number is used by callers to place calls to the wireless set. For example, if wired set 107 places a call to wired set 108 that is unanswered, communication switching system 102 transfers the call to voice mail system 101. The latter system records a message from the user of wired set 107. After the message is recorded, voice mail system 101 places a call using the first telephone number for wireless set 109. Wireless switching system 103 is responsive to a call on the first telephone number for setting the message waiting indicator on wireless set 109 by transmission of a message to wireless set 109. After the message has been accessed, voice mail system 101 places a second call utilizing the second telephone number of wireless set 109. In response to the call utilizing the second telephone number of wireless set 109, wireless switching system 103 transmits a message to wireless set 109 to turn the message waiting indicator off.

Figure 5:
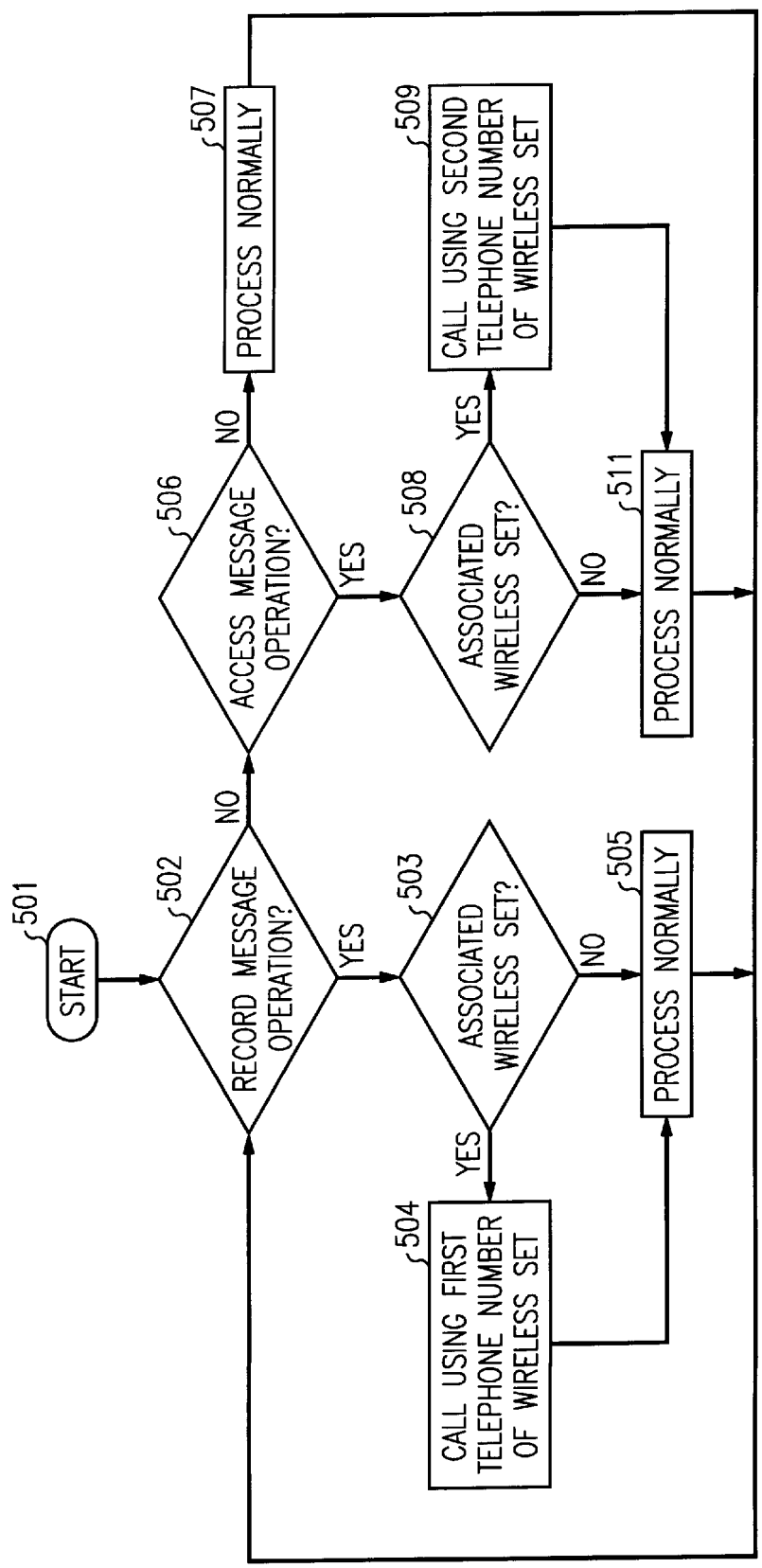
FIGS. 5 and 6 illustrate, in flow chart form, the steps performed to implement the second embodiment of the invention.

FIG. 5 illustrates, in flow chart form, the steps performed by voice mail system 101 in implementing the second embodiment of the invention. After the steps are started by execution of block 501, decision block 502 determines if a request has been received from communication switching system 102 to record a message. If the answer is yes in decision block 502, decision block 503 determines if there is a wireless set associated with the wired set for which the message is to be recorded. If the answer is yes, block 504 places a call to the first telephone number of the associated wireless set. As will be described with respect to FIG. 6, wireless switching system 103 accepts and then disconnects this call. After execution of block 504, block 505 performs normal processing of the message record operation before transferring control back to decision block 502. If the answer is no in decision block 503, control is transferred to block 505.

If the decision is made in decision block 502 that the operation is not to record a message, control is transferred to decision block 506 which determines if the operation is a user accessing messages. If the answer is no in decision block 506, block 507 performs normal processing before returning control back to decision block 502. If the answer in decision block 506 is yes, decision block 508 determines if there is a wireless set associated with the wired set whose messages are being accessed. If the answer is no in decision block 508, control is transferred to block 511 which performs normal processing before returning control back to decision block 502. If the answer is yes in decision block 508, block 509 places a call using the second telephone number of the wireless set which results in the messaging waiting indicator on the wireless set being reset.

Figure 6:
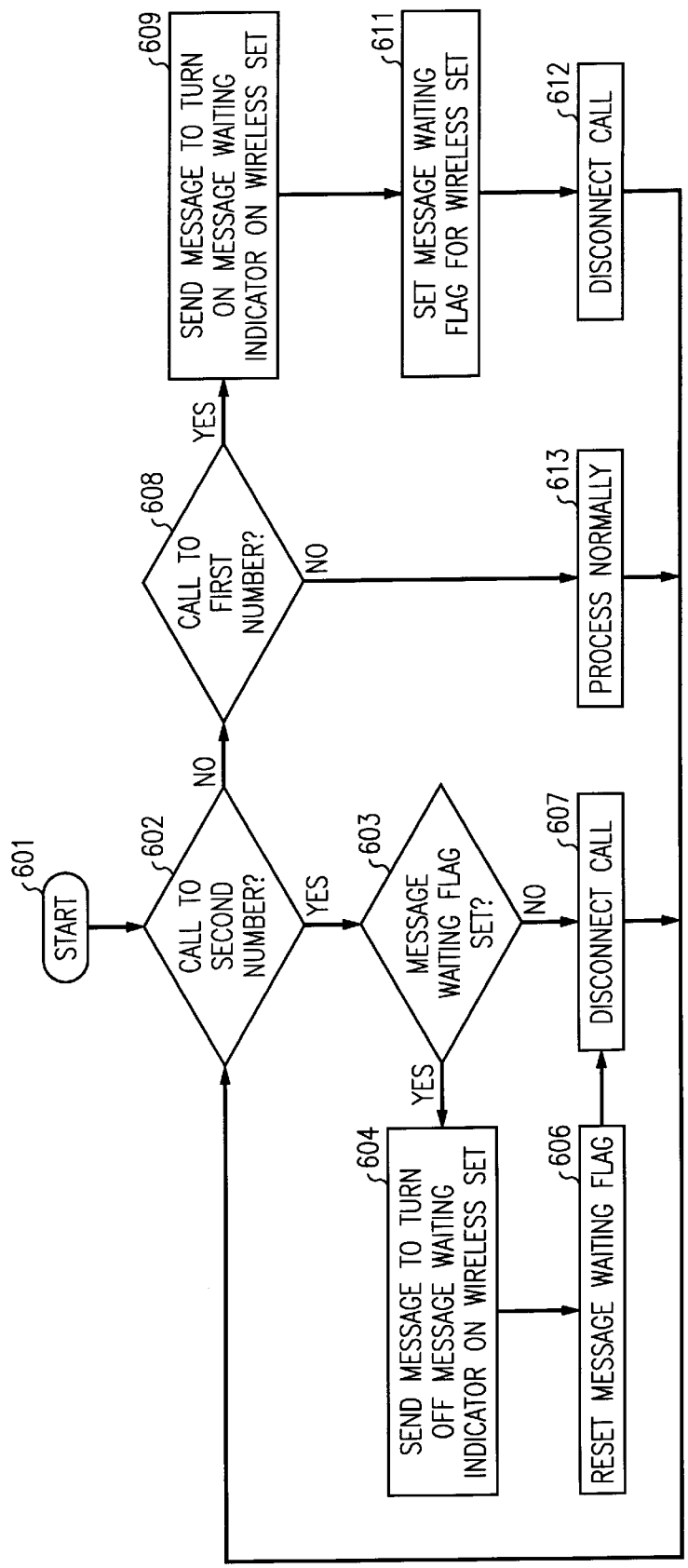

FIG. 6 illustrates, in flow chart form, steps performed by wireless switching system 103 in implementing the second embodiment of the invention. After the steps are started by execution of block 601, decision block 602 determines if a call is being received on the second telephone number of any of the wireless sets. A call on the second telephone number of a wireless set indicates that the message waiting indicator may have to be reset. If the answer in decision block 603 is yes, block 604 sends a message to the wireless set to reset the message waiting indicator, and block 606 resets the message waiting flag before transferring control to block 607. Block 607 disconnects the call from the voice mail system 101 received via communication switching system 102. After execution of block 607, control is transferred back to decision block 602. If the message waiting flag is not set as determined by decision block 603, control is simply transferred to block 607.

Returning to decision block 602, if the answer is no, control is transferred to decision block 608 which determines if a wireless set is being called utilizing a first telephone number. If the answer is no, control is transferred to block 613 which performs normal processing before transferring control back to decision block 602. If the answer in decision block 608 is yes, control is transferred to block 609 which sends a message to set the message waiting indicator on the wireless set. Next, block 611 sets the message waiting flag for the wireless set, and block 612 disconnects the call from voice mail system 101 before transferring control back to decision block 602.

In the third embodiment of the invention, communication switching system 102 is responsive to messages from voice mail system 101 to set and reset the message waiting indicators on wired sets 107–108 and to place calls to the first and second telephone numbers of the associated wireless sets. The operations performed by wireless switching system 103 for the third embodiment are illustrated in FIG. 6. After the steps are started by execution of block 701, decision block 702 determines if a message has been received to set the message waiting indicator on a wired set. If the answer is yes, decision block 703 determines if there is an associated wireless set. If the answer in decision block 703 is no, control is transferred to block 705 which performs normal processing that includes setting the message waiting indicator on the wired telephone before transferring control back to decision block 702. If the answer in decision block 703 is yes, block 704 places a call to the associated wireless set utilizing the first telephone number of the wireless set before transferring control to block 705.

Returning to decision block 702, if the answer is no, control is transferred to decision block 706 which determines if a message has been received to reset the message waiting indicator on a wired set. If the answer is no, block 707 performs normal processing before transferring control back to decision block 702. If the answer in decision block 706 is yes, decision block 708 determines if there is an associated wireless set. If the answer is no, block 711 performs normal processing including resetting the message waiting indicator on the wired set before transferring control back to decision block 702. If the answer in decision block 708 is yes, block 709 places a call to the associated wireless set utilizing the second telephone number before transferring control to block 711.

Figure 7:
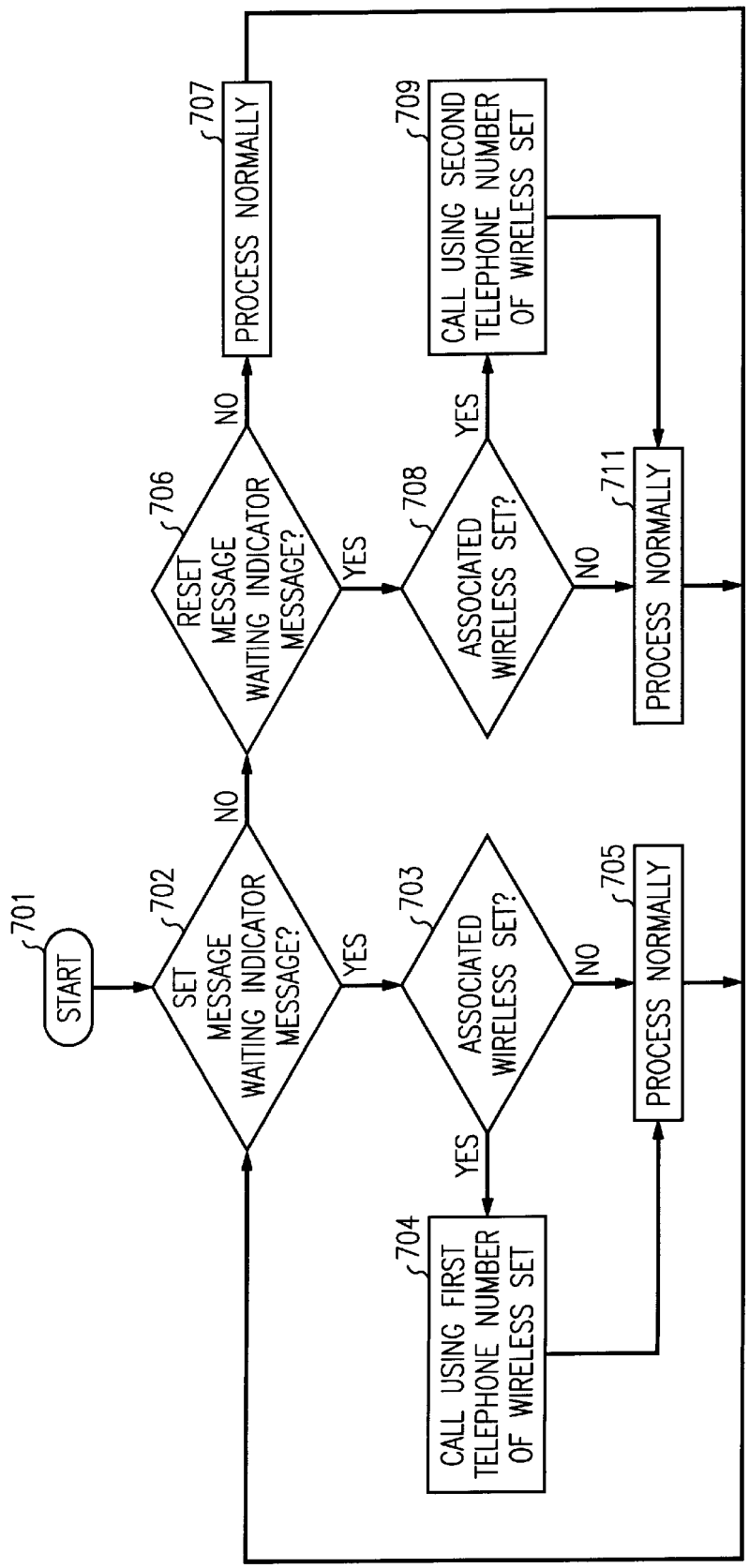
FIG. 7 illustrates, in flow chart form, the steps performed by a communication switching system to implement the third embodiment of the invention.
Figure 8:
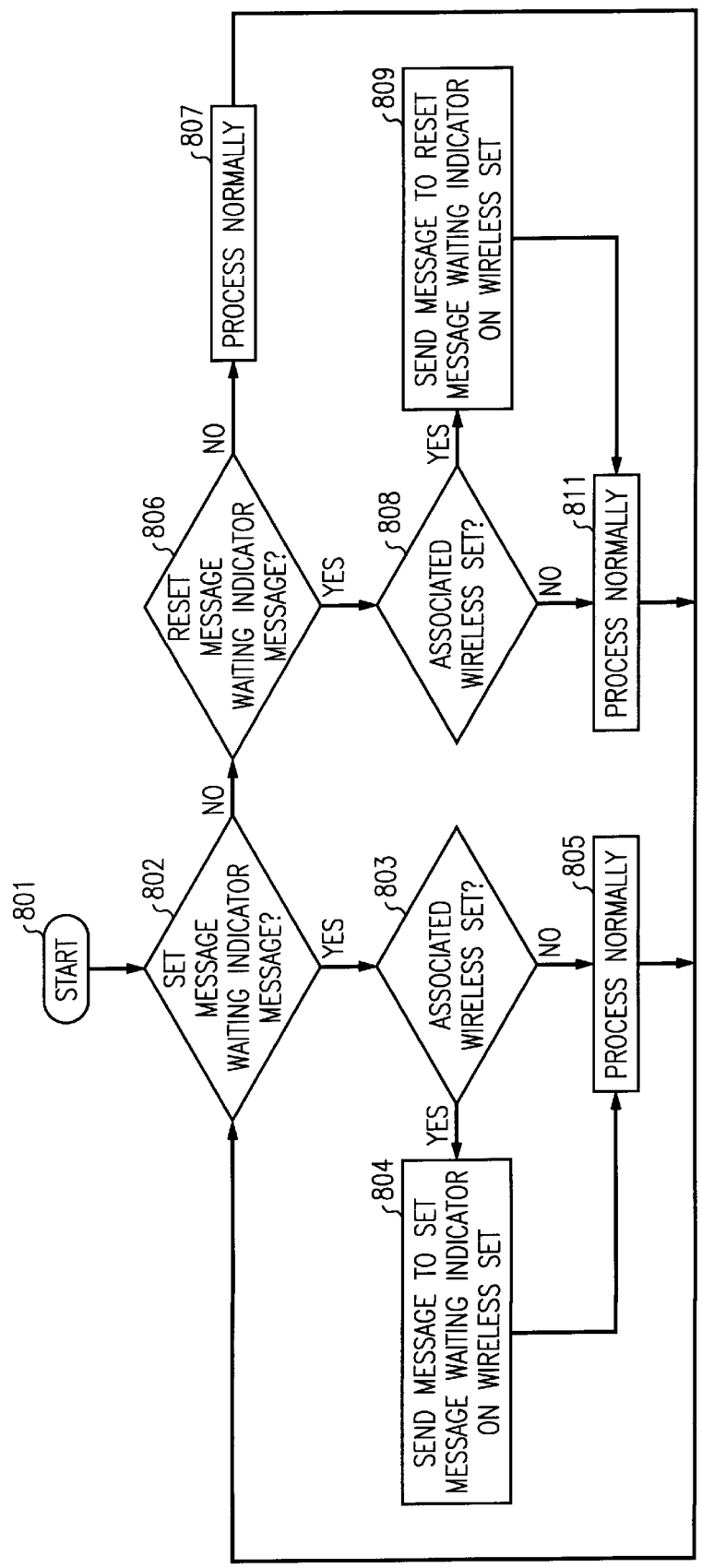

In the fourth embodiment of the invention, communication switching system 102 is responsive to messages from voice mail system 101 to reset and set the message waiting indicator on a wired set and to transmit control messages to wireless switching system 103 to set or reset the message waiting indicators on associated wireless sets. FIG. 8 illustrates, in flow chart form, the steps performed by communication switching system 102 in implementing the fourth embodiment. Blocks 801–811 are identical in operation to blocks 701–711 of FIG. 7 with the exception of blocks 804 and 809. Block 804 sends a control message to set the message waiting indicator on a wireless set to wireless switching system 103, and block 809 sends a control message to reset the message waiting indicator on a wireless set to wireless switching system 103 in order to perform the set and reset operations.

FIG. 9 illustrates, in flow chart form, the operations performed by wireless switching system 103 in implementing the fourth embodiment of the invention. After the steps are started by execution of block 901, decision block 902 determines if a message has been received from communication switching system 102 to reset a message waiting indicator on a wireless set. If the answer is yes, block 904 sends a message to the wireless set to turn off the message waiting indicator before transferring control back to decision block 902. If the answer in decision block 902 is no, decision block 903 determines if a message was received from communication switching system 102 to set the message waiting indicator on a wireless set. If the answer is no in decision block 903, block 906 performs normal processing before transferring control back to decision block 902. If the answer in decision block 903 is yes, block 907 sends a message to the wireless set to turn on the message waiting indicator for transferring control back to decision block 902.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for indicating a waiting message for a first communication terminal on a wireless terminal identified with the first communication terminal, comprising the steps of:

receiving by a message system an unanswered communication request for the first communication terminal from a second communication terminal;

communicating by the message system a first communication request identifying the wireless terminal using first identification information to a wireless switching system and using a message system feature operation to periodically communicate a plurality of communication requests at predefined intervals using the first identification information for the wireless terminal;

transmitting only a first message to the wireless terminal to set a message waiting indicator on the wireless terminal by the wireless switching system in response to the first of the plurality of communication requests;

resetting the message waiting indicator on the wireless terminal by transmission of a second message by the wireless switching system in response to receiving a communication request to the message system from the wireless terminal; and resetting the message-waiting indicator upon one of the plurality of communication requests not being within the predefined interval.

2. The method of claim 1 wherein a communication request is a telephone call and the identification information is a telephone number.

3. A method for indicating a waiting message for a first communication terminal on a wireless terminal identified with the first communication terminal, comprising the steps of:

receiving a message by a message system in response to an unanswered communication request for the first communication terminal from a second communication terminal;

communicating a first communication request identifying the wireless terminal using first identification information to a wireless switching system in response to the received message;

transmitting a first message to the wireless terminal to set a message waiting indicator on the wireless terminal by the wireless switching system in response to the first communication request;

receiving a request to access the message by the message system;

communicating a second communication request identifying the wireless terminal using second identification information to the wireless switching system in response to the access request; and transmitting a second message to the wireless terminal to reset a message waiting indicator on the wireless terminal by the wireless switching system in response to the second communication request.

4. The method of claim 3 wherein a communication request is a telephone call and identification information is a telephone number.

5. The method of claim 3 wherein the wireless switching system is a wireless telecommunication switching system and the wireless terminal is a wireless telephone.

6. The method of claim 3 wherein the wireless switching system is a paging system and the wireless terminal is a pager.

7. A method for indicating on a wireless terminal a waiting message stored on a message system for a first communication terminal with the first communication terminal connected to a communication switching system and the wireless terminal identified with the first communication terminal and connected to a wireless switching system, comprising the steps of:

detecting by the communication switching system that the first communication terminal is not answering a first communication request from a second communication terminal;

transferring the unanswered first communication request to the message system;

recording a message by the message system in response to the unanswered first communication request for the first communication terminal;

transmitting a first message to the communication switching system to set a message waiting indicator on the first communication terminal by the message system in response to the recorded message;

communicating a second communication request identifying the wireless terminal using first identification information to a wireless switching system in response to the received first message by the communication switching system;

transmitting a second message to the wireless terminal to set a message waiting indicator on the wireless terminal by the wireless switching system in response to the first communication request;

receiving a request to access the message by the message system;

transmitting a third message to the communication switching system to reset the message waiting indicator on the first communication terminal by the message system in response to the access request;

communicating a third communication request identifying the wireless terminal using second identification information by the communication switching system to the wireless switching system in response to the third message; and transmitting a fourth message to the wireless terminal to reset a message waiting indicator on the wireless terminal by the wireless switching system in response to the fourth communication request.

8. The method of claim 7 wherein a communication request is a telephone call and identification information is a telephone number.

9. The method of claim 7 wherein the wireless switching system is a wireless telecommunication switching system and the wireless terminal is a wireless telephone.

10. The method of claim 7 wherein the wireless switching system is a paging system and the wireless terminal is a pager.

11. A method for indicating a waiting message for a first communication terminal on a wireless terminal identified with the first communication terminal, comprising the steps of:

receiving a first communication request defining a waiting message and identifying a wireless terminal using first identification information by a wireless switching system and using a message system feature operation to periodically communicate a plurality of communication requests at predefined intervals using the first identification information for the wireless terminal;

transmitting only a first message to the wireless terminal to set a message waiting indicator on the wireless terminal by the wireless switching system in response to the first of the plurality of communication requests; and resetting the message-waiting indicator upon one of the plurality of communication requests not being within the predefined interval.

12. The method of claim 11 wherein a communication request is a telephone call and the identification information is a telephone number.

13. The method of claim 11 wherein the wireless switching system is a paging system and the wireless terminal is a pager.

14. The method of claim 11 wherein the wireless switching system is a wireless telecommunication switching system and the wireless terminal is a wireless telephone.

15. A method for indicating a waiting message for a first communication terminal on a wireless terminal identified with the first communication terminal, comprising the steps of:

receiving a first communication request identifying the wireless terminal and defining a waiting message using first identification information by a wireless switching system;

transmitting a first message to the wireless terminal to set a message waiting indicator on the wireless terminal by the wireless switching system in response to the first communication request;

receiving a second communication request identifying the wireless terminal and defining that a message had been accessed using second identification information to the wireless switching system in response to the access request; and transmitting a second message to the wireless terminal to reset the message waiting indicator on the wireless terminal by the wireless switching system in response to the second communication request.

16. The method of claim 15 wherein a communication request is a telephone call and identification information is a telephone number.

17. The method of claim 15 wherein the wireless switching system is a wireless telecommunication switching system and the wireless terminal is a wireless telephone.

18. The method of claim 15 wherein the wireless switching system is a paging system and the wireless terminal is a pager.

19. A method for indicating on a wireless terminal a waiting message stored on a message system for a first communication terminal with the first communication terminal connected to a communication switching system and the wireless terminal identified with the first communication terminal and connected to a wireless switching system, comprising the steps of:

receiving a first message by the communication switching system to set a message waiting indicator on the first communication terminal;

communicating a second communication request identifying the wireless terminal using first identification information to a wireless switching system in response to the received first message by the communication switching system; and transmitting a second message to the wireless terminal to set a message waiting indicator on the wireless terminal by the wireless switching system in response to the first communication request;

receiving a third message by the communication switching system to reset the message waiting indicator on the first communication terminal;

communicating a third communication request identifying the wireless terminal using second identification information by the communication switching system to the wireless switching system in response to the third message; and transmitting a fourth message to the wireless terminal to reset the message waiting indicator on the wireless terminal by the wireless switching system in response to the fourth communication request.

20. The method of claim 19 wherein a communication request is a telephone call and identification information is a telephone number.

21. The method of claim 19 wherein the wireless switching system is a wireless telecommunication switching system and the wireless terminal is a wireless telephone.

22. The method of claim 19 wherein the wireless switching system is a paging system and the wireless terminal is a pager.

* * * * *